3,457,444
EDGEWISE HELICALLY WOUND COMPOSITE STRIP MOTOR WINDING WITH HIGH TEMPERATURE INSULATION

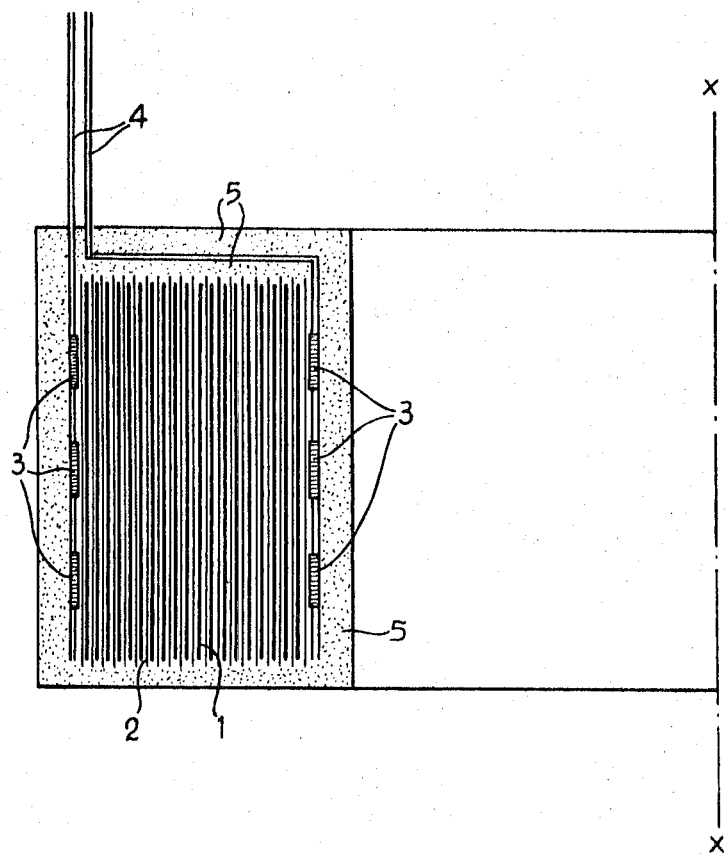

Luciano Parodi and Maurizio Vallauri, Turin, Italy, assignors to Fiat Società per Azioni, Turin, Italy
Filed Apr. 16, 1968, Ser. No. 721,641
Claims priority, application Italy, Apr. 19, 1967, 794,429/67
Int. Cl. H02k 3/00
U.S. Cl. 310—179      6 Claims

ABSTRACT OF THE DISCLOSURE

An electric motor winding with high temperature insulation formed with edgewise helically wound composite strip conductor comprising a first strip of low resistivity (e.g., silver) in parallel with a juxtaposed superficially oxidized second strip (e.g., aluminum), the surface oxide of which acts as insulation between turns.

---

This invention relates to windings for electric motors operable at temperatures exceeding 300° C., particularly where such temperatures result from the dissipation of heat due to electric current flow in the windings.

Electric motor windings operable at temperatures exceeding 300° C. are known, and generally consist of turns of copper wire protected by a nickel plating against chemical attack at high temperatures, with ceramic insulation being provided between contiguous turns of the wire.

An alternative form of known winding for high temperature operation consists of a conductive aluminum strip having a surface oxidation which acts as an insulation between contiguous turns of the strip.

An object of the present invention is to provide an electric motor winding operable at high temperature and capable of sustaining high current densities.

With this object in view the electric motor winding according to the invention comprises: (i) a composite conductor element comprising (a) a first strip of low resistivity conductive material; (b) a second strip of superficially oxidized conductive material of higher resistivity disposed face-to-face with said low resistivity strip, and (c) means interconnecting said strips in parallel; and (ii) a plurality of helical turns of said composite conductor element wound concentrically about the axis of the winding, the oxidized surfaces of the second strip forming the insulation between contiguous turns of the first strip upon current flow through the conductor element.

The winding according to the invention permits a high filling ratio of the available volume of the winding with conductive material of low resistivity.

The invention also provides for the use of insulating material having high dielectric properties and high mechanical, chemical and heat stability, said material occupying a very restricted volume, which advantageously leaves ample space for the conductor element.

A further object of the invention is to provide for the use in a said winding of conductive material, the physical and chemical state of which remains unaltered up to temperatures exceeding 600° C. With this object in view the first strip is preferably formed of silver and the second strip of superficially oxidized aluminum.

The superficially oxidized second strip, being conductive, contributes directly to the current flow through the winding. The second strip performs, therefore, two functions, its main function consisting in supporting the oxidized insulating layers and a secondary function being as a current-carrying conductor; for these reasons the second strip is preferably of very small thickness, leaving ample space available for the low resistivity first strip.

The invention will be more clearly understood from the following detailed description, given by way of non-limiting example, with reference to the accompanying drawing, which is an axial diagrammatical view of one half of a toroidal electric motor winding according to the invention.

The winding has an axis of symmetry X—X about which a plurality of helical turns of a composite conductor element are wound concentrically. The composite conductor element comprises a first conductive strip 1 of low resistivity, such as silver, and a second conductive strip 2 of higher resistivity having superficial oxidation and in face-to-face contact with the first strip 1. The two strips 1 and 2 are connected in parallel at their ends at junctions 3.

The first conductive strip 1 may, for instance, be 0.1 mm. thick and 50 mm. wide; it may be made of silver or copper-plated with nickel for protective purposes.

The second strip 2 is preferably of aluminum and may be 0.025 mm. thick, the superficial oxidation being of a few microns thickness, and the strip being slightly more than 50 mm. wide. Thus, the second strip may have a thickness which bears a ratio to the thickness of the first strip of between 1:4 and 1:5.

The junctions 3 between the strips 1, 2 at the two ends of the winding are made simply by superposition of the strips 1, 2 after removal in part of the oxidized surface layer of the second strip 2. Alternatively the junctions 3 may be made by soldering or rolling.

Current supply leads 4, preferably made of silver wire, and directly connected to the ends of the first strip 1 by soldering.

The winding is provided with insulation 5, with respect to both the outside and with respect to the leads 4, which is conveniently of the tape disclosed in a copending application of even date, and comprises inorganic material, such as mica, asbestos or ceramic products in suitable combination in order to provide a compact insulation having good dielectric and mechanical properties which are stable at temperatures exceeding 300° C.

We claim:
1. Electric motor winding operable at temperatures exceeding 300° C. and comprising:
 (i) a composite conductor element comprising:
  (a) a first strip of low resistivity conductive material,
  (b) a second strip of superficially oxidized conductive material of higher resistivity disposed face-to-face with said low resistivity strip, and
  (c) means interconnecting said strips in parallel; and
 (ii) a plurality of helical turns of said composite conductor element wound concentrically about the axis of the winding, the oxidized surfaces of the second strip forming the insulation between contiguous turns of the first strip upon current flow through the conductor element.

2. Winding as claimed in claim 1 wherein the second strip has a thickness which bears a ratio to the thickness of the first strip of between 1:4 and 1:5.

3. Winding as claimed in claim 1 wherein the second strip is slightly wider than the first strip.

4. Winding as claimed in claim 1 wherein the means interconnecting the strips comprise respective joints formed at opposite respective ends of the composite conductor element between the first strip and the conductive material of the second strip underlying the oxidized surface thereof.

5. Winding as claimed in claim 1 wherein the first strip comprises silver.

6. Winding as claimed in claim 1 wherein the second strip comprises superficially oxidized aluminium.

References Cited

UNITED STATES PATENTS

| | | | |
|---|---|---|---|
| 830,419 | 9/1906 | Dowens | 336—192 |
| 2,756,358 | 7/1956 | Johnson | 310—180 |
| 3,353,040 | 11/1967 | Abbott | 310—27 |

WARREN E. RAY, Primary Examiner

U.S. Cl. X.R.

310—71, 195, 210